2,880,107
STARCH MODIFIED BY HYDANTOINS

Hillary Robinette, Jr., Philadelphia, Pa.

No Drawing. Application April 30, 1954
Serial No. 426,918

13 Claims. (Cl. 106—211)

This invention relates to the use of hydantoins in modifying starch, to starch carrying an N–N dihalohydantoin, to compositions containing such modified starches including coating and sizing compositions and printing pastes, to fibers and yarns sized or coated or printed with such compositions including sized yarns, coated papers, etc., and to methods of preparing and utilizing said compositions.

It is known that viscosities of starch suspensions can be modified by various means—by homogenizing—that is, subjecting the swollen starch granules to high shearing forces or by treatment with enzymes or acids to degrade the starch. These methods are either expensive as in the case of the use of homogenizing equipment, or are difficult to control as in the case of the use of enzymes or acids. Further, the enzymes and acids convert the starch, at least in part, into dextrins or sugars or other degradation products, which not only entail losses of starch components, but may interfere with the properties desired in the ultimate composition.

Among the objects of the present invention is the use of N–N dihalohydantoins as modifiers of starch to improve starch compositions for various utilizations.

Further objects include the treatment of various substrates with said modified starch compositions to size or coat or otherwise treat the substrate and methods of such treatment.

Still further objects and advantages of the present invention will appear from the more detailed description set forth below, it being understood that such more detailed description is given by way of illustration and explanation only, and not by way of limitation, since various changes therein may be made by those skilled in the art, without departing from the scope and spirit of the present invention.

In accordance with the present invention it has been found that starches may be usefully modified for utilization for any purposes for which starch is employed as a coating or finishing or sizing or carrying agent as for example for use in textile yarn sizing, textile finishing, slashing baths, printing pastes, coating compositions as for cellulose and other substrates specifically paper. The starches are modified by an N–N dihalohydantoin having the formula

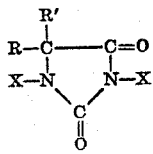

wherein R and R' represent hydrogen or a nonfunctional radical such as an aliphatic hydrocarbon radical particularly an alkyl or aralkyl group, an aryl or alkaryl, or a cycloalkyl group, etc.; and X is halogen particularly chlorine or bromine or iodine. R and R' may be the same or different substituents and the halogens present need not necessarily be the same in both substituents.

Thus when R or R' is alkyl, the group may be chosen from methyl, ethyl, propyl, isopropyl, butyl, isobutyl, tertiary butyl, the various amyl, hexyl, heptyl, octyl and higher, alkyls; when aryl the group may be phenyl, toluyl, etc.; when cycloalkyl may be cyclopropyl, cyclobutyl, cyclopentyl, cyclohexyl, cycloheptyl, etc.

For use in the preparation of sizing and coating compositions and printing pastes, the alkyl groups present will desirably have less than 6 carbon atoms, and the aryl group will be phenyl, and in general the sum of the carbon atoms, represented by the substituents R and R' will be less than ten.

The modified starches are desirably prepared by cooking the starch as in an aqueous medium to prepare a starch bath, in the presence of the N–N dihalohydantoin whereby the viscosity of the bath is favorably modified and the properties improved. In such procedures, the N–N dihalohydantoins cause no degradation of the starch and no conversion into dextrins or sugars as has been the effects of prior art treatments with enzymes or acids. In the present process no starch is lost or wasted by conversion to useless sugars, all starch is present as starch but in a more desirable form. The N–N dihalohydantoin breaks the large micelles of the swollen starch granules into smaller micelles which are more easily dispersed in water. In other words, the effect of the N–N dihalohydantoin is to increase the dispersion of the starch by modifying the micellar structure. The minute starch particles formed by the action of the N–N dihalohydantoins produce better films and possess improved penetration. Better films thus obtained are particularly useful in paper coating compositions and improved penetration is important in textile yarn sizing operations.

It has been found that the effect of the N–N dihalohydantoin is a rather general one for a rather large group, as represented by selections from the various substituents referred to above. However for particular fields of utilization in paper coating, textile yarn sizing, and printing paste, typical compounds particularly useful include N–N dichloro 5 methyl hydantoin; N–N dichloro 5,5 dimethyl hydantoin; N–N dichloro 5 methyl 5 phenyl hydantoin; N–N dichloro 5 phenyl hydantoin; N–N dichloro 5 methyl 5 ethyl hydantoin. The corresponding N–N dibromo compounds also are useful as is likewise N–N diiodo dimethyl hydantoin.

Any type or kind of starch may be utilized with the N–N dihalohydantoin. All types of starch are modified by the hydantoin compounds. The N–N dihalohydantoin is, of course, more favorably used on the so-called "heavy boiling" starches—those containing substantial amounts of amylose. A typical example is pearl corn starch. Favorable modification is also effected on other starches—that derived from potatoes, known as potato starch; starch from tapioca; Amioca, a trade name for a starch high in amylopectin and derived from a waxy maize; wheat starch from wheat; etc.

The amount of N–N dihalohydantoin employed may vary substantially. Very small fractions of a percent based on the weight of the starch may be employed for example .1% or less up to .6% or more. Neither figure is limiting since the actual amount may vary with the kind of starch and the conditions of preparation of the dispersion. While much higher amounts may be used, it is unnecessary to do so.

Instead of making the dispersion for transportation and sale, substantially dry mixtures of the starch and N–N dihalohydantoin may be made, with or without any desired adjuvants commonly used in starch sizing and coating compositions and starch printing pastes, and such dry mixtures sold in commerce for conversion into dispersions at the point of consumption. In such dry compositions, the ratios of starch to N–N dihalohydantoin may vary as desired. For example, they may be packaged in the amounts given above so that they may be directly dispersed in water with or without adjuvants or the adjuvants when used may be in whole or in part in the starch composition. Or a dry mix containing a concentrate of the N–N dihalohydantoin in the starch may be used, for example, the hydantoin derivative may be any major or minor amount of such mix which for use may be mixed dry with starch or other materials to give the desired ratios, or which concentrate may be added to a starch paste in proportions to give a desired mix.

The amount of water employed in preparing the dispersion, coating composition or paste may be varied widely to give a starch content usually desired in a particular art depending on the practices in the particular field where used.

As indicated above, various additives and adjuvants commonly employed in starch sizing and coating compositions and printing pastes may be included. As adjuvants, there are generally used in combination with starch for sizing and finishing, substances which plasticize the starch film, prevent sticking, and improve adhesion. The N–N dihalohydantoin does, to some extent, by improving the film characteristics, perform these functions. Other substances which may be used include tallow, hydrogenated tallow, fatty acid esters of glycerine, fatty acid esters of polyethylene glycol, sulfonated or sulfated fatty glycerides or other fatty acid esters, paraffin oils, paraffin wax, vegetable or insect wax, petrolatum, and, in conjunction with starch, other film-forming materials such as sodium polyacrylate, methyl cellulose, carboxyl methyl cellulose, polyacrylic acid, polymethacrylic acid, alkaline metal salts of styrene-maleic anhydride copolymers, or vinyl acetate-maleic anhydride copolymers; humectants such as ethylene glycol, glycerine, glycerol bori-borate, glycol bori-borate, urea; and inorganic salts such as sodium or magnesium sulfate and calcium chloride. A saturated glyceride may be used as a binder.

With regard to the uses of starches modified with the N–N dihalohydantoins by the paper industry, it may be stated that such starches can be used either as beater sizes or as calender sizes. For calender sizing, a wide range of strength of starch solution is used. The majority of mills use between .2 and .35 of a pound of starch per U.S. gallon. The amount of N–N dihalohydantoin may be in the order of .2% to .6% based on the weight of the starch. Prior to application, the starch dispersion is cooked at the boil for an hour to an hour and a half until a uniform dispersion is obtained. Through the use of a heavy boiling pearl starch modified with an N–N dihalohydantoin, as a calender size for paper, higher bursting strength, better finish, finer and closer surface, greater sheet stiffness, less fluff or dust, and increased water resistance are obtained. In the beater application, 1% to 5% of starch of the pulp weight is used, the starch is cooked as described above and applied directly in the beater at a pH of 4.3 to 4.6. Some of the benefits of using starch modified with the N–N dihalohydantoins as a beater size are improved paper finish, printing surface, increased bursting strength, greater resistance to abrasion, and less fuzz.

Starch compositions as set forth herein may be utilized as sizing compositions for fibers and as finishing composition for fabrics, wherever starch sizing or finishing compositions have heretofore been used. Any types of fibers or fabrics which have been subjected to sizing or finishing with starch compositions may be treated with the compositions of the present invention. As exemplary of the fibers that may be treated are cotton and wool, and synthetic fibers such as acetate, viscose rayon, "Acrylan," "Dacron," nylon, etc., and fabrics made from such fibers. A printing paste may be made by incorporating a printing component into an aqueous dispersion of starch containing the N–N dihalohydantoin.

Chemical change may also take place depending on the conditions employed in the production or utilization of the compositions. The N–N dihalohydantoins may change chemically depending on the temperature used and the length of time during the course of their being cooked with aqueous dispersions of starches. Active chlorine may be liberated from the N–N dihalohydantoin leaving dispersed in the aqueous system, the hydantoin without chlorine. The chlorine liberated may function as an oxidizing agent and through an oxidative process disrupt the large micelles of the starch forming smaller micelles. In addition, some chlorination of the starch may occur although this is not likely. The hydantoins used do not have to be water soluble. They should however be capable of being dispersed in the aqueous starch slurries.

The following table shows the effect of various concentrations of several of the subject compounds on the viscosity of starch suspensions. The indicated amount of compound was added to a slurry of 20 grams of Clinton's pearl starch in 400 grams of water. The resulting mixture was cooked on a steam bath for 1½ hours, and the viscosities of the resulting starch solutions measured with a Brookfield viscometer at 30 r.p.m.'s of a #2 spindle.

TABLE 1

| Compounds | Amount, gms. | Scale Reading |
| --- | --- | --- |
| none | none | 700 |
| N–N dichloro 5,5 dimethyl hydantoin | .02 | 320 |
|  | .04 | 41 |
|  | .08 | 36 |
| N–N dichloro 5 methyl 5 ethyl hydantoin | .0214 | 410 |
|  | .0428 | 240 |
|  | .0642 | 92 |
| N–N dibromo 5,5 dimethyl hydantoin | .029 | 255 |
|  | .038 | 152 |
|  | .076 | 17 |
| N–N diiodo 5,5 dimethyl hydantoin | .0398 | 407 |
|  | .0796 | 387 |
|  | .1194 | 386 |

The scale reading is proportional to the viscosity—the higher the viscosity the higher the scale reading. It can be readily seen from the table that the effects on viscosities of starch solutions by small amounts of the subject compounds are spectacular and entirely unexpected.

The following examples serve to show the practical utility of starch baths modified through the use of the subject compounds for sizing textile warps.

*Example 1*

10 singles cotton warp yarns sized from the following bath showed less shedding and improved weavability (loom efficiency) when compared to a similar warp of 10 singles cotton sized from a bath containing no N–N dichloro dimethyl hydantoin.

Formula:
  44 lbs. pearl corn starch
  1 oz. N–N dichloro 5,5 dimethyl hydantoin
  3½ lbs. binder (a saturated glyceride)
  1¾ lbs. tallow
  7 oz. wax The ingredients were mixed with water and cooked with live steam for 1½ hours and the final volume adjusted to 100 gallons.

*Example 2*

30 singles cotton warp yarns sized from the following bath showed less shedding and better weavability than a beam of 30 singles cotton yarns sized from a bath similar in every respect except that it did not contain any N–N dibromo 5,5 dimethyl hydantoin.

Formula:
- 90 lbs. thin boiling starch (acid treated starch)
- .125 lb. N–N dibromo 5,5 dimethyl hydantoin
- 7¼ lbs. tallow softener

Example 3

A beam warp yarns containing 80% spun acetate and 20% spun viscose rayon was sized with the following formula:

- 70 lbs. starch gum
- .5 lb. N–N dichloro 5 methyl 5 ethyl hydantoin
- .75 lb. tallow softener These warps showed less shedding and better weavability than similar warps sized from a bath containing no N–N dichloro 5 methyl 5 ethyl hydantoin.

In addition to the above examples, small hand sheets of paper have been coated with starch paste prepared with and without the subject compounds included in the formulation. In every case, the paper coated with the starch paste containing the N–N dihalo 5 methyl hydantoin exhibited smoother, more glossy surfaces and better ink reception than paper coated with starch paste prepared without the subject compounds.

Having thus set forth my invention, I claim:

1. Starch carrying an N–N dihalohydantoin in substantial amount to modify the viscosity of the starch the hydantoin having the formula

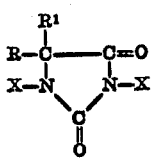

where R and R¹ are selected from the group consisting of hydrogen and monovalent hydrocarbon radicals of alkyl, aryl, and cycloalkyl, and X is a halogen selected from the group consisting of chlorine, bromine, and iodine.

2. The composition of claim 1 in which the halogen is chlorine and the hydrocarbon radicals are methyl.
3. The composition of claim 1 in which the halogen is bromine and the hydrocarbon radicals are methyl.
4. A cellulose substrate coated with the composition of claim 1.
5. Warp yarns sized with the composition of claim 1.
6. Cellulose yarn sized with the composition of claim 1.
7. Wool yarn sized with the composition of claim 1.
8. Synthetic fiber yarn sized with the composition of claim 1.
9. Fabrics sized with the composition of claim 1.
10. An aqueous starch dispersion of the composition of claim 1.
11. The method of preparing starch which comprises dispersing starch in an aqueous medium in the presence of a substantial amount of an N–N dihalohydantoin to modify the viscosity of the starch dispersion, the hydantoin having the formula

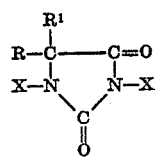

where R and R¹ are selected from the group consisting of hydrogen and monovalent hydrocarbon radicals of alkyl, aryl, and cycloalkyl, and X is halogen selected from the group consisting of chlorine, bromine, and iodine.

12. The method of claim 11 in which the halogen is chlorine and the hydrocarbon radicals are methyl.
13. The method of claim 11 in which the halogen is bromine and the hydrocarbon radicals are methyl.

References Cited in the file of this patent

UNITED STATES PATENTS

| | | |
|---|---|---|
| 2,398,598 | Rogers | Apr. 16, 1946 |
| 2,398,599 | Rogers | Apr. 16, 1946 |
| 2,441,360 | Hamin | May 11, 1948 |